United States Patent [19]

Schülein et al.

[11] 4,247,054
[45] Jan. 27, 1981

[54] ARRANGEMENT FOR COMMINUTING FOODSTUFFS

[75] Inventors: Rolf G. Schülein, Singhofen; Johannes Liebscher, Nassau; Dieter Himmighofen, Roth, all of Fed. Rep. of Germany

[73] Assignee: Leifheit International Günter Leifheit, Nassau, Fed. Rep. of Germany

[21] Appl. No.: 29,913

[22] Filed: Apr. 16, 1979

[30] Foreign Application Priority Data

Apr. 19, 1978 [DE] Fed. Rep. of Germany ....... 2816929
Mar. 9, 1978 [DE] Fed. Rep. of Germany ....... 2909308

[51] Int. Cl.³ .............................................. A47J 43/25
[52] U.S. Cl. ....................................... 241/95; 241/168; 241/273.1; 241/285 R
[58] Field of Search ................... 425/183, 185; 241/95, 241/168, 93, 273.1, 273.2, 273.3, 273.4, 276, 280, 92, 281, 285 R

[56] References Cited

U.S. PATENT DOCUMENTS

| 1,922,973 | 8/1933 | Mischanski | 241/273.1 |
| 2,741,286 | 4/1956 | Bittle | 241/95 |
| 4,081,145 | 3/1978 | Moe et al. | 241/93 |

Primary Examiner—Mark Rosenbaum
Attorney, Agent, or Firm—Michael J. Striker

[57] ABSTRACT

An arrangement for comminuting foodstuffs, such as potatoes, cucumbers, carrots, fruits and the like, has an elongated plate provided with a through-going opening in which one comminuting plate member can be accommodated so as to perform comminuting of a foodstuff. The elongated plate has a receptacle which is spaced from the through-going opening and is adapted to receive another comminuting plate member which is not utilized for comminuting at that very moment. The foodstuffs to be comminuted move relative to an upper surface of the base plate, whereas the receptacle for receiving the comminuting plate member which is not utilized, is formed in a lower surface of the base plate. A foodstuff holder is provided which is adapted to hold a foodstuff to be comminuted and to be placed on upper longitudinal walls of the base plate.

47 Claims, 11 Drawing Figures

ARRANGEMENT FOR COMMINUTING FOODSTUFFS

BACKGROUND OF THE INVENTION

The present invention relates to an arrangement for comminuting foodstuffs. More particularly, it relates to an arrangement which can be utilized for rubbing, cutting by discs, chipping and the like of foodstuffs, such as potatoes, cucumbers, carrots, fruits and the like.

Arrangements for comminuting foodstuffs of this general type are known in the art. A known arrangement has an elongated base plate provided with a handle and having an upper surface relative to which a foodstuff to be comminuted is moved by hand in opposite directions. A through-going opening pierces the base plate. One or several comminuting plate members which are adapted to perform various comminuting operations, can be accommodated in the through-going opening so that when the foodstuff is moved it is comminuted by this comminuting plate member. In the known arrangements the comminuting plate members are separate from the base plate and not associated with the latter. Only the comminuting plate member which is accommodated in the through-going opening and directly utilized at that very instant for comminuting, is held in the base plate. For this reason, a housewife must keep the other comminuting plate members separately from the base plate in some other places, wherefore they can be lost.

SUMMARY OF THE INVENTION

Accordingly, it is an object of the present invention to provide an arrangement for comminuting foodstuffs, which avoids the disadvantages of the prior art.

More particularly, it is an object of the present invention to provide an arrangement for comminuting foodstuffs in which communiting plate members which are not utilized at that very instant for comminuting, can also be held and stored by a base plate of the arrangement and thereby cannot be lost.

In keeping with these objects and with others which will become apparent hereinafter, one feature of the present invention resides, briefly stated, in an arrangement for comminuting foodstuffs, whose base plate has not only a through-going opening for accommodating a comminuting plate member which performs comminuting of a foodstuff at that very instant, but also a receptacle at a lower side of the base plate in which receptacle comminuting members which are not utilized at that very instant can be received.

In such a construction, the comminuting members which are not utilized at that very moment for comminuting, are held in the arrangement in a simple manner and cannot be lost. In order to perform each particular comminuting operation, a respective comminuting plate member can be withdrawn from the receptacle and placed in a working position, that is accommodated in the through-going opening.

The comminuting member which performs the comminuting operation, and the comminuting members which are not utilized at that very instant can be inserted into the through-going opening and the receptacle in a direction transverse to the direction of elongation of the base plate. Thereby, comminuting plate members are held in the base plate in a simple manner.

The base plate may be constituted by a synthetic plastic material. It may be provided with lower longitudinal walls extending downwardly from a lower surface and along longitudinal edges of the base plate. A plurality of reinforcing ribs may also be provided on a lower surface of the base plate and extend between the lower longitudinal walls as well as connect the latter with each other. The through-going opening for accommodating the comminuting plate member in the working position may be formed between the two longitudinal walls and two of the reinforcing ribs. In such a construction the base plate may have a small thickness and, at the same time, may have a high shape stability.

A receptacle in the region of the through-going opening may be provided for receiving the comminuting plate member in its working position. This receptacle may be formed by slots provided in the two reinforcing ribs, and more particularly in their faces adjacent to the through-going opening, as well as in the one lower longitudinal wall, and more particularly in its face facing toward the through-going opening. The thus-formed receptacle may be rectangular. An inlet slot communicating with this receptacle may be formed in the other lower longitudinal wall, so that the comminuting plate member can be inserted into the receptacle from outside through this inlet slot.

Similarly to this, the receptacle for receiving the particular comminuting plate member which is not utilized at a particular time may be formed by two slots in inner faces of two other reinforcing ribs, and in an inner face of the one lower longitudinal wall. The other lower longitudinal wall may be provided with an additional inlet slot communicating with the thus-formed receptacle. Thereby, the comminuting plate member which is not utilized at that very instant can be inserted into its receptacle through the additional inlet slot.

The comminuting members may be accommodated in the above-mentioned two receptacles so that they are arrested or clamped in the respective slots. Thereby, retension of the comminuting plate members in the base plate is attained in simple manner.

Each of the comminuting plate members may have a plurality of uniform raised highly curved or convex portions provided with cutting edges. The length of the comminuting plate members may be such that when they are inserted in the respective receptacles, their end sections extend laterally outwardly beyond the other lower longitudinal wall of the base plate.

The sections of the comminuting plate member, which extend laterally outwardly beyond the other lower longitudinal wall in inserted condition, may be tubularly rolled so as to form a handle. Thereby, handling of the comminuting plate members are further easier and simpler.

The lower longitudinal walls may have extensions at one end of the base plate, and a tubular handle may be provided on the base plate between these extensions. Such a handle can be easily formed on the base plate.

The height of the lower longitudinal walls at the lower side of the base plate may decrease from the region of its handle to the other end of the base plate. In such a construction, the decreasing height of the lower longitudinal walls corresponds to applied loads.

A free lower face of the lower longitudinal walls may be provided with a plurality of projections formed as waves, teeth, pins and the like. In such a construction, when the base plate of the arrangement is placed onto a pot, dish and the like, upper edges of the latter engage in a recess formed between the projections of the lower face of the lower longitudinal walls so that slipping or displacement of the arrangement relative to the above-mentioned containers are prevented.

The base plate may be provided with upper longitudinal walls extending upwardly from an upper surface of the base plate and along the longitudinal edges of the latter. The upper walls may have substantially upright wall portions which merge into wall portions extending substantially parallel to the base plate. The latter-mentioned wall portions can support a foodstuff holder. The foodstuff holder holds a foodstuff to be comminuted and, naturally, holds a remaining portion of the foodstuff when some portion of the latter has already comminuted. The wall portions reinforce the base plate so as to increase its shape stability, and at the same time serve for supporting the foodstuff holder.

The foodstuff holder may have a supporting portion adapted to support on the second-mentioned wall portions of the upper longitudinal walls of the base plate, and a pressing portion which is movable relative to the supporting portion in a direction transverse to the base plate. The supporting portion may be composed of a disc-shaped section located parallel to the base plate and adapted to support on the upper longitudinal walls of the latter, and a tubular section bounding an inner opening for accommodating a foodstuff. The foodstuff to be comminuted is easily held in the inner opening of the tubular section until it contacts the upper surface of the base plate, and then is pressed by the pressing portion against the comminuting plate member when the latter is in its working position.

The disc-shaped section of the supporting portion of the foodstuff holder may be provided with a tubular projection which extends downwardly and is located between outer edges of the disc-shaped section of the supporting portion, on the one hand, and the other diameter of the tubular section of the supporting portion, on the other hand. Reliable guidance of the foodstuff holder by the tubular projection is attained in a simple manner.

The tubular section of the supporting portion may have a triangular cross-section and outwardly convex walls. Such a tubular section has a non-round shape and is easy to be firmly held by a user.

The tubular section may have a bottom wall at its end spaced from the base plate. The bottom plate may have a plurality of through-going holes through which pressing projections provided on the pressing portion extend. The tubular section forms an inner chamber which is closed to its lower end so that a foodstuff to be comminuted can be received in this chamber. At the same time, the pressing projections of the pressing portion press the foodstuff against the comminuting plate member located in the working position.

The foodstuff holder may be provided with a sticking pin which pierces the foodstuff and thereby arrests it. The sticking pin is held in a tubular projection formed on the bottom wall of the tubular section of the foodstuff holder. Thereby, the foodstuff to be comminuted can be firmly held in the interior of the tubular portion.

The pressing portion may be formed as a hood having an upper wall at the end spaced from the base plate. The above-mentioned pressing projections may be formed on this upper wall of the hood. The hood can be fitted onto the tubular section of the foodstuff holder in simple manner.

The pressing projections may be hollow and open at their ends adjacent to the upper wall. In such a construction, the hood can be easily manufactured of a synthetic plastic material with uniform wall thickness.

The tubular section of the supporting portion of the foodstuff holder may be provided with an inwardly extending arresting projection of a semicircular cross-section which cooperates with a free end of the pressing projections. Thereby, an end stop for the hood is formed in a simple manner and the hood cannot be easily removed from the tubular section. However, it can be removed from the tubular section by application of a pulling force which can overcome the resistance of the arresting projection. Thus, the parts of the foodstuff holder can be separated from each other for cleaning purposes.

An intermediate wall located between the pressing projections may be provided in the pressing portion of the foodstuff holder. This intermediate wall can abut against the bottom wall of the tubular section of the supporting portion. Thereby, abutment is provided for preventing excessive movement of the hood onto the tubular section to another end position.

The pressing projections may include one circular pressing projection located in a central region of the upper wall of the hood, and three oval pressing projections which surround the circular pressing projection. Thereby, a great part of the cross-section of an inner passage of the tubular section of the foodstuff holder is overlapped and filled by the pressing projections of the hood.

The pressing projections may be provided with tips at their free ends. These tips are adapted to press into a foodstuff to be comminuted and hinder slipping or displacement of the latter.

The base plate may be provided with an abutment member located in the region adjacent to the handle of the base member and extending upwardly beyond the upper surface of the base plate. The foodstuff holder abuts against the abutment member during operation and cannot strike fingers of a user when he or she grips the handle of the base plate.

The abutment member may have a rectangular cross-section and be of one piece with an end portion of the base plate constituted by a synthetic plastic material. The abutment member may be formed centrally of this end portion of the base plate. Thereby, the manufacture of the base plate is not affected. At the same time, the abutment member is located centrally of the foodstuff holder when the latter is moved over the upper surface of the base plate. The disc-shaped section of the foodstuff holder abuts against the abutment member during this movement.

The abutment member can simultaneously serve for suspending the foodstuff holder on the base plate. When the arrangement is not utilized, it is suspended on a wall hook and the like by the handle provided on the base plate. At the same time, the foodstuff holder can be suspended on the abutment member, so that the base plate with the inserted comminuting plate members, together with the foodstuff holder, form a suspensible unit.

A free end of the abutment member may be bent toward the handle of the base plate, and the disc-shaped section of the foodstuff holder may be provided with an elongated hole. The foodstuff holder can be suspended by its elongated hole on the bent abutment member. The bent abutment member prevents unintentional falling of the foodstuff holder.

Finally, the foodstuff holder can be held on the abutment member so as to be arrested on the latter. In such a case, the foodstuff holder is reliably held on the arrangement.

The elongated hole of the disc-shaped section of the foodstuff holder may have a curved contour. When the abutment member extends through the curved elongated hole, the foodstuff holder is arrestingly clamped on the abutment member.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

An arrangement in accordance with the present invention is utilized for comminuting by rubbing, cutting by discs, slicing and the like of foodstuffs such as potatoes, cucumbers, carrots, fruits and the like.

The arrangement has an elongated base plate 21 having a handle 20 at its one end. A foodstuff to be comminuted is held in a foodstuff holder 23 and moved by the latter relative to an upper surface 22 of the base plate 21 in opposite directions. The base plate 21 has a through-going opening 24 which extends to a lower surface of the base plate 21. Several comminuting plates are provided. They have differing constructions so as to perform different comminuting operations. One of the comminuting plates having a construction which corresponds to an intended comminuting operation, can be accommodated in the through-going opening 24.

The base plate 21 is advantageously constituted by a synthetic plastic material and has lower longitudinal walls 26 which extend downwardly from the base plate and along its longitudinal edges. A plurality of reinforcing ribs 27 also extend downwardly from the base plate 21 and between the lower longitudinal walls 26 so as to connect them with each other. The through-going opening 24 in which the comminuting plate is accommodated for performing a comminuting operation, is formed between the lower longitudinal walls 26 and two reinforcing ribs 27.

A receptacle 28 for holding the comminuting plate in its working position is provided in the region of the through-going opening 24. The receptacle 28 is formed in the following manner. Groove-like guide slots 29 are provided in lateral inner faces 30 which are increased by the reinforcing ribs 27. A front inner face 31 which is increased by the lower longitudinal wall 26 in the region between these two reinforcing ribs 27 is also provided with a guiding slot 32. The slots 29 and the slot 32 together form the receptacle 28 for receiving of the comminuting plate 25 in its working position. A front edge of the comminuting plate 25 is received in the slot 32, whereas lateral edges of the comminuting plate 25 are received in the slots 29.

In order to insert the comminuting plate 25 into the receptacle 28, an inlet slot 33 is formed in the other lower longitudinal wall 26. The inlet slot 33 extends from an outer side of the other lower longitudinal wall and is open into the through-going opening 24. Thereby the comminuting plate 25 can be laterally inserted into the receptacle 28 through the inlet slot 33 in simple manner. The comminuting plate 25 is retained in the receptacle 28, e.g. in the slots 29 and 32, under the action of friction.

Further receptacles 34 are formed in the base plate 21 in the region spaced from the through-going opening 24 in which the first-mentioned receptacle 28 is provided. The first-mentioned receptacle 28 serves for receiving the comminuting plate which is utilized at that very instant for comminuting of a foodstuff. In contrast, the further receptacle 34 serves for receiving the comminuting plates which are not utilized for comminuting at that very instant. Therefore, the comminuting plates which are not utilized are reliably held in the base plate, and no separate places for their storage are necessary.

Each of the receptacles 34 is formed in the following manner. Groove-like guide slots 35 are formed in lateral faces of two other reinforcing ribs 27 facing toward one another, and in a portion of one lower longitudinal wall 26 in its region located between the two other reinforcing ribs 27. The comminuting plates inserted in the receptacle 34 engage by their front and lateral edges in the slots 35 of the receptacle 34. An inlet slot 36 is provided in the other longitudinal wall, through which inlet slot the communicating plate may be inserted into the receptacle 34. When the comminuting plates which are not utilized at that very instant are received in the receptacle 34 they are arrested or clamped in the slots 35 of the receptacle.

Figure 1:
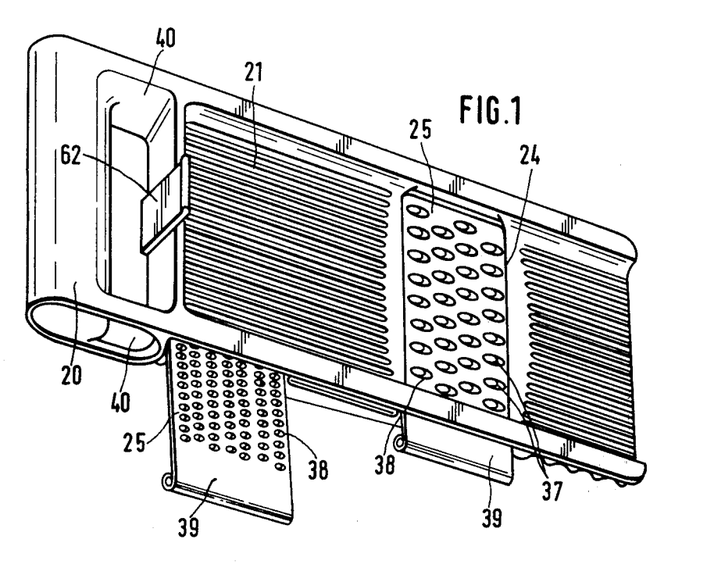
FIG. 1 is a perspective view of an arrangement for comminuting foodstuffs with a removed foodstuff holder in accordance with the present invention.
Figure 2:
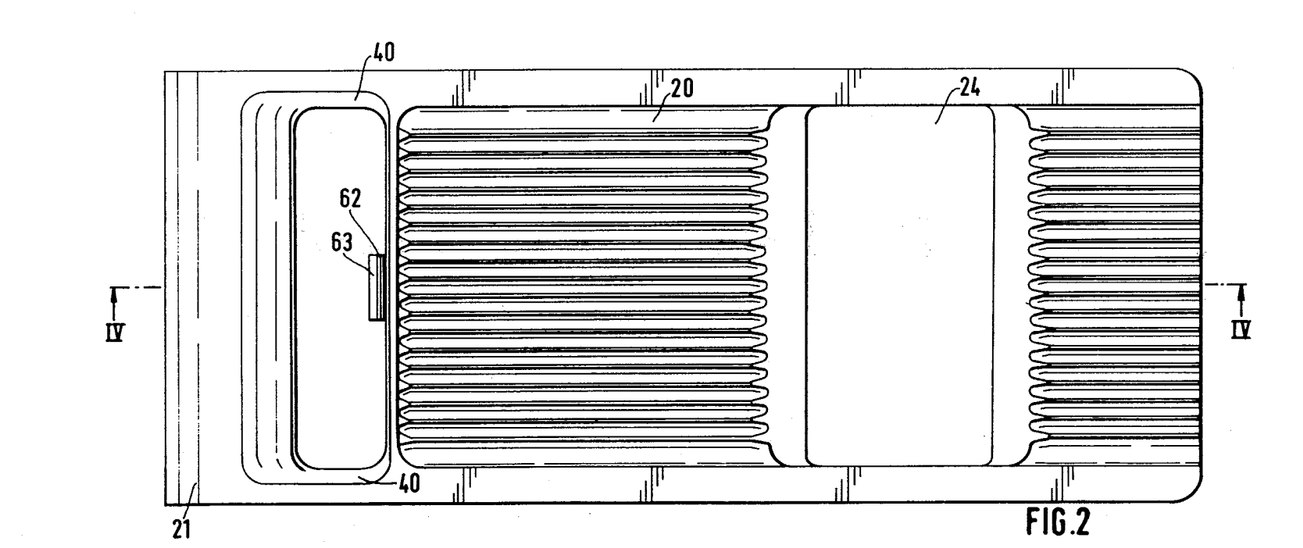
FIG. 2 is a plan view of the arrangement shown in FIG. 1.

As can be seen particularly from FIG. 1, each of the comminuting plates has a plurality of raised portions 38 which are substantially uniform and highly curved or convex. The portions 38 have cutting edges 37. Each of comminuting plates 25 has such a length that when they are inserted in the receptacle 28 and/or the receptacle 34, their rear end portions 39 extend laterally outwardly beyond the base plate 21. These rear end portions 39 are rolled so as to form a handle on each comminuting plate 25. Thereby, a user can easily pull the comminuting plates 25 out of the receptacles 28 and 34 and insert other comminuting plates into these receptacles.

Figure 4:
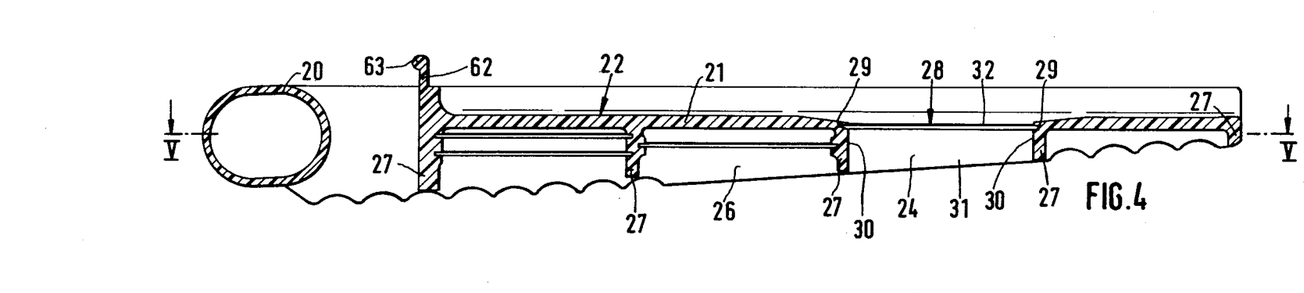
FIG. 4 is a view showing a section taken along line IV—IV of FIG. 2.
Figure 5:
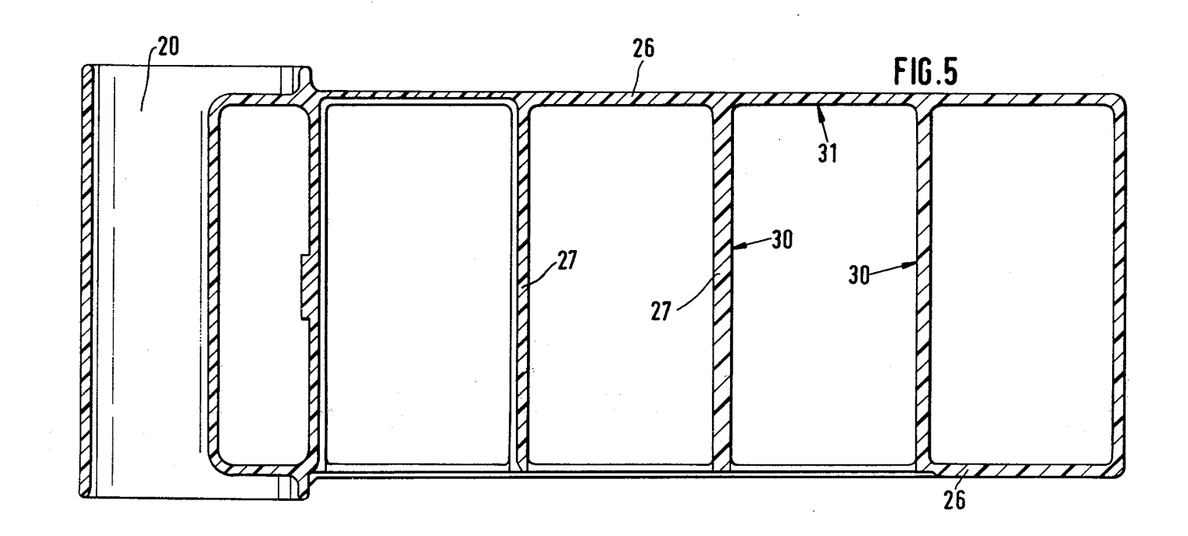
FIG. 5 is a view showing a section taken along line V—V of FIG. 4.

The lower longitudinal walls 26 of the base plate 21 have extensions 40 which are provided at an end of the lower longitudinal walls and also extend downwardly from the lower surface of the base plate. This can be seen particularly in FIG. 4. The tubular handle 20 is formed between the extensions 40 of the lower longitudinal walls 26. The height of the lower longitudinal walls 26 gradually decreases from the region of the handle 20 to another end of the base plate 21 so as to correspond to distribution of applied loads.

Figure 3:
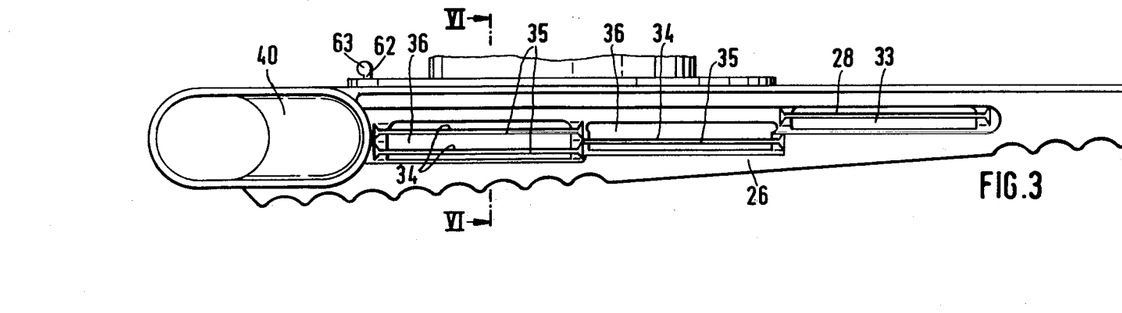
FIG. 3 is a side view of the arrangement shown in FIG. 1.

As can be seen particularly from FIG. 3, the lower longitudinal walls 26 have free end faces in the lower end regions, which end faces are provided with a plurality of projections. As shown in the drawing, the projections are wave-like. However, these projections may be formed as teeth, pins and the like. When the arrangement is placed on a container, such as a pot, a dish and the like, an upper edge of the container engages in recesses between the projections, whereby slipping of the base plate relative to the container is prevented.

Figure 6:
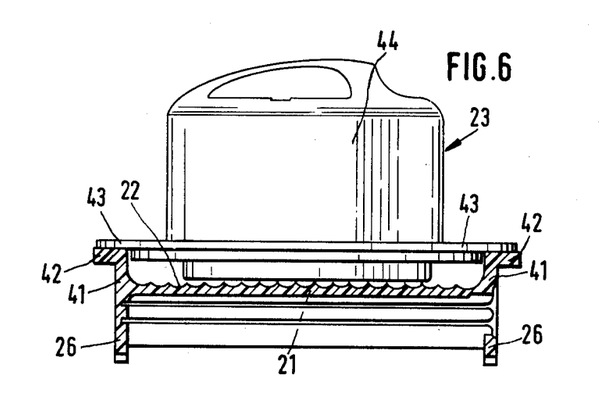
FIG. 6 is a view showing a section taken along line VI—VI of FIG. 3.

As can be seen particularly from FIG. 6, the base plate 21 has longitudinal wall portions 41 extending upwardly from the base plate. The longitudinal wall portions 41 extend from the handle 20 along the lateral longitudinal edges of the base plate 21. The wall portions 41 merge into further wall portions 42 which extend laterally outwardly from the wall portions 41 and substantially parallel to the base plate 21. The wall portions 42 serve for supporting the foodstuff holder 23 when the latter is placed onto the base plate 21.

The foodstuff holder 23 has a disc portion 43 which can lie on the wall portions 42 extending parallel to the base plate 21. The foodstuff holder 23 further has a tubular portion 45 which is of one piece with the disc portion 43 and bounds an inner passage into which a foodstuff to be comminuted can be received. A next part of the foodstuff holder is a pressing portion 44 which moves relative to the tubular portion 45 so as to press a foodstuff. The tubular portion 45 extends downwardly beyond the disc portion 43 and to the upper surface 22 of the base plate 21 when the disc portion 43 rests on the wall portions 42 of the latter.

The disc portion 43 has a tubular projection 46 which extends downwardly and is located substantially centrally between the outer edge of the disc portion 43 and the outer diameter of the tubular portion 45. The projection 46 guides the foodstuff holder in its movement inbetween the wall portions 41 of the base plate 21. The tubular portion 45 may have a triangular cross-section and outwardly convex side walls 47. The thus-constructed tubular portion 45 has a non-round shape and can be easily gripped by a user. The tubular portion 45 has a bottom wall 48 at its end which is spaced from the base plate 21. Several through-going holes 49 are formed in the bottom wall 48. On the other hand, the pressing part 44 have several pressing projections 50 which extend through the holes 49 of the bottom plate 48 of the tubular portion 45. A metallic sticking pin 51 is located between the through-going holes 49 and serves for piercing or penetrating into a foodstuff to be comminuted. The sticking pin 51 is held in a tubular projection or sleeve 52 which is provided on the bottom wall 48 of the tubular portion 45 of the foodstuff holder. The foodstuffs to be comminuted is retained by the sticking pin 51 against displacement in the tubular portion 45.

The pressing portion 44 is formed as a hood 53 which movably limits the inner passage of the tubular portion 45 from above. For this purpose, the hood 53 has an upper wall 54. The above-mentioned pressing projections 50 are provided on and extend from the upper wall 54 of the hood 53. The pressing projections 50 are hollow and open at their ends adjacent to the upper wall 53. Thereby, the hood 53 can be easily manufactured of a synthetic plastic material, and a uniform wall thickness may be maintained.

An end section of the tubular portion 45 adjacent the base plate 21 has arresting projections 55 with a substantially semicircular cross-section. Free ends of the pressing projections 50 have abutments 56 which cooperate with the arresting projections 55. The arresting projections 55 engage in slots 57 of the pressing projections 50, whereas the abutments 56 are formed by a rear side of an end wall 58 of the pressing projections 50. The arresting projections 55 prevent unintensional removal of the hood 53 from the tubular portion 45 of the foodstuff holder during movement of the hood 53 upwardly. However, for the purposes of cleaning of the foodstuff holder 23, the hood 53 can be removed from the tubular section 45 by forced pulling of the hood.

In order to limit the movement of the hood 53 relative to the tubular portion 45 in opposite direction, that is during movement of the hood 53 downwardly, the upper wall 54 of the hood 53 is provided with an upright wall 59 formed as an abutment. The upright wall 59 abuts against the bottom wall 48 of the tubular portion 45 when the hood 53 is in its lower position. The movement of the hood 53 relative to the tubular portion 45 is thereby limited at both sides. However, separation of these parts from each other is possible.

The arresting projections 55 of a semicircular cross-section has a guiding bevel 60. The bevel 60 makes easier fitting of the hood 53 onto the tubular portion 45 of the foodstuff holder 23.

The pressing projections 50 provided in the hood 53 includes one central pressing projection 50 of a circular cross-section and three further pressing projections 50 having a substantially oval cross-section. The oval pressing projection 50 outwardly surrounds the central circular projection 50. In such a construction the entire cross-section of the inner passage of the tubular portion 45 in which a foodstuff to be comminuted is received, is overlapped and filled by the pressing projections 50. The pressing projections 50 carry tips 61 at their free end faces. During a particular application, the tips 61 penetrate into a foodstuff to be comminuted so that slipping or displacement of the foodstuff in the interior of the tubular portion 45 is prevented.

An abutment member 62 is provided on the base plate 21, and more particularly at its end portion adjacent to and facing toward the handle 20. The abutment member extends upwardly beyond the upper surface 20 of the base plate 21, and so that the foodstuff holder 23 can abut against the abutment member 62. Thereby, the disc portion 43 of the foodstuff holder 23 cannot strike against fingers of a user, when he or she grips the handle 20. The abutment member 62 has a rectangular cross-section and is formed in a substantially central region of the reinforcing rib 27. In a shown example, the abutment member 62 is provided at a side surface of the reinforcing rib 27. The abutment member 62 can also be formed on the upper surface of the base plate 21 in a simple manner.

A free end section 63 of the abutment member 62 is somewhat inclined or curved toward the handle 20. Thereby, the abutment member can be easily utilized for suspending the foodstuff holder 23. The disc portion 43 is provided, for this purpose, with an elongated hole 64 which can be seen particularly in FIG. 7. The foodstuff holder 23 can be suspended by its elongated hole 64 on the abutment member 62 as shown in FIG. 3. The entire arrangement can be suspended by its handle 20 on a wall hook and the like as a unit.

Figures 7, 7A, 10:
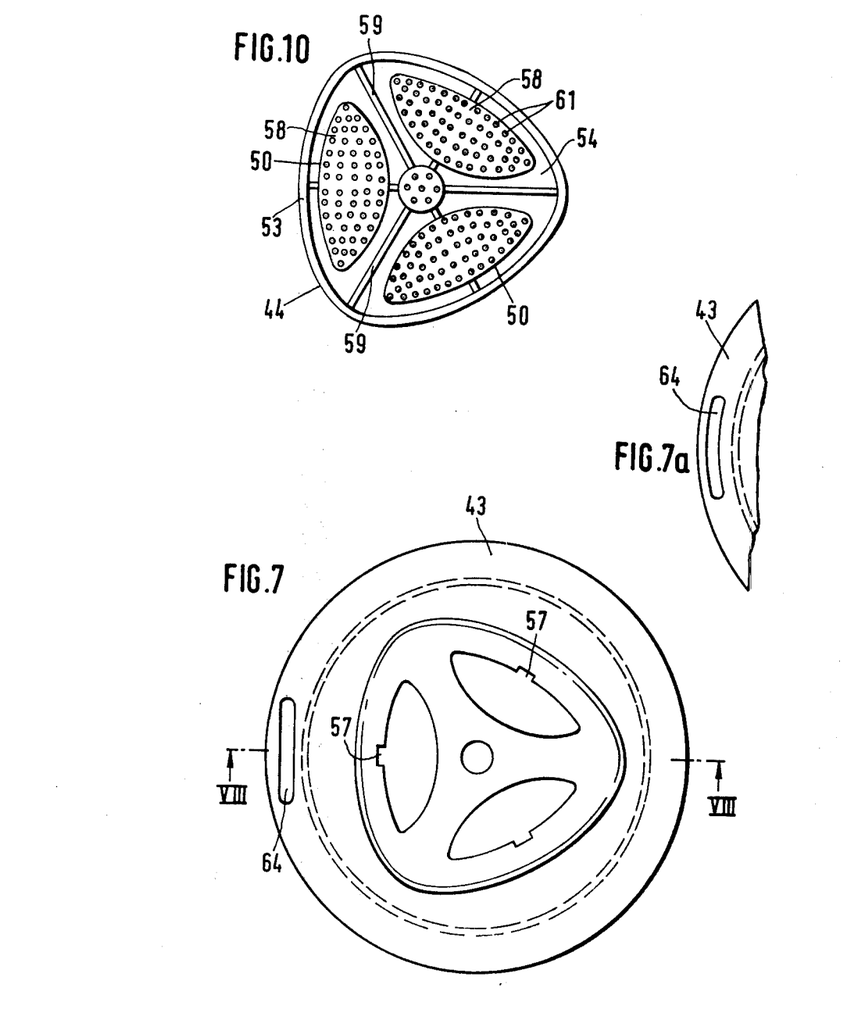
FIG. 7 is a plan view of the foodstuff holder in accordance with the present invention.
FIG. 7a is a view corresponding to that shown in FIG. 7, but illustrating another embodiment of the present invention.
FIG. 10 is a view showing an upper part of the foodstuff holder from below.
Figure 8:
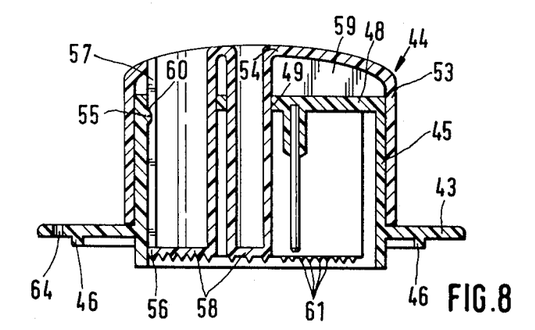
FIG. 8 is a view showing a section taken along line VIII—VIII of FIG. 7.
Figure 9:
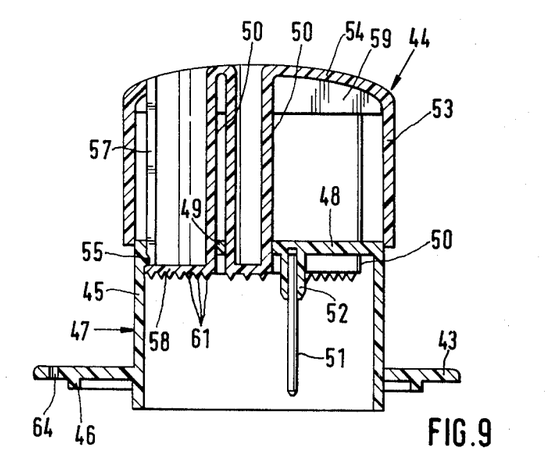
FIG. 9 is a view corresponding to that shown in FIG. 8, but illustrating the parts of the arrangement in another position.

In order to prevent unintentional losing of the foodstuff holder 23, arresting of the latter may be provided. This is shown in FIG. 7a. The elongated hole 64 which is formed in the disc portion 43 of the foodstuff holder 23, can be curved or arcuate. When the abutment 62 extends through the thus-shaped elongated hole 64 it is arrested or clamped in the latter.

The comminuting plates 25 can be constituted of a synthetic plastic material and provided with metallic cutting edges.

It will be understood that each of the elements described above, or two or more together, may also find a useful application in other types of constructions differing from the types described above.

While the invention has been illustrated and described as embodied in an arrangement for comminuting foodstuffs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for comminuting foodstuffs, such as potatoes, cucumbers, carrots, fruits and the like, with the use of comminuting plate members, comprising an elongated base plate having an upper surface relative to which foodstuffs to be comminuted are moved, and a lower surface spaced from said upper surface, said elongated base plate having a through-going opening extending between said upper and lower surfaces and arranged to removably accommodate one comminuting plate member so as to perform comminuting of a foodstuff by the latter, said elongated base plate having a plurality of receptacles spaced from said opening and formed at said lower surface of said base plate, each of said receptacles being arranged to individually removably store another comminuting plate member which is not utilized for comminuting at that very instant, and each of said receptacles being outwardly open so that each of the other stored comminuting plate members may be taken out of a respective one of said receptacles without taking out the remaining other comminuting plate members and without removing any part of the arrangement.

2. An arrangement as defined in claim 1, wherein said elongated base plate is provided with a handle.

3. An arrangement as defined in claim 1, wherein said through-going opening is formed in a central region of said base plate, said receptacles being spaced from said through-going opening in the direction of elongation of said base plate.

4. An arrangement as defined in claim 1, wherein the comminuting plate members have differing constructions so as to perform different comminuting operations, said through-going opening and said receptacles being arranged for accommodating the comminuting plate members of different constructions.

5. An arrangement as defined in claim 1, wherein said through-going opening and said receptacles are so arranged that the comminuting plate members are inserted into them in a direction transverse to the direction of elongation of said base plate.

6. An arrangement as defined in claim 1, wherein said base plate is constituted of a synthetic plastic material.

7. An arrangement as defined in claim 1, wherein said base plate has longitudinal edges and a lower side, said base plate having two lower longitudinal walls extending downwardly from said lower side and along said longitudinal edges, said base plate further having reinforcing ribs extending between said lower longitudinal walls and connecting them with each other.

8. An arrangement as defined in claim 7, wherein said elongated base plate has two ends spaced from one another in the longitudinal direction, each of said longitudinal walls having an extension at one of said ends; and comprising a tubular handle arranged between said extensions of said lower longitudinal walls.

9. An arrangement as defined in claim 8, wherein said base plate has longitudinal edges and an upper side, said base plate having two upper longitudinal walls extending upwardly from said upper side and along said longitudinal edges to said tubular handle; and further comprising a holder for holding at least a remaining portion of a foodstuff, said holder being arranged to support on said upper longitudinal walls of said base plate.

10. An arrangement as defined in claim 9, wherein said base plate has abutment member which is located adjacent to said tubular handle and extends upwardly of said upper surface of said base plate, said abutment member being arranged so that said foodstuff holder can laterally abut against said abutment member.

11. An arrangement as defined in claim 10, wherein said base plate is constituted of a synthetic plastic material, said abutment member being formed of one piece with said base plate at said one end of the latter.

12. An arrangement as defined in claim 10, wherein said foodstuff holder is suspensible on said abutment member.

13. An arrangement as defined in claim 12, wherein said abutment member is somewhat curved in a direction toward said tubular handle, said foodstuff holder having a supporting portion arranged to support on said base plate, and a pressing portion movable relative to said supporting portion in a direction transverse to said base plate, said supporting portion of said foodstuff holder having an elongated hole through which said abutment member of said base portion can extend.

14. An arrangement as defined in claim 13, wherein said foodstuff holder is suspended on said abutment member of said base plate in arrested condition so as to prevent removal of the former from the latter; and further comprising arresting means for arresting said foodstuff holder on said abutment member.

15. An arrangement as defined in claim 14, wherein said elongated hole of said supporting portion of said foodstuff holder has a curved contour so as to form said arresting means.

16. An arrangement as defined in claim 9, wherein each of said upper longitudinal walls has a first wall portion which is substantially upright, and a second wall portion which extends from said first wall portion laterally outwardly and substantially parallel to said upper surface of said base plate, said second wall portions being arranged to support said foodstuff holder.

17. An arrangement as defined in claim 16, wherein said foodstuff holder has a supporting portion arranged to support on said second wall portions of said upper longitudinal walls of said base plate, said foodstuff holder further having a pressing portion movable relative to said supporting portion in a direction transverse to said upper surface of said base plate.

18. An arrangement as defined in claim 17, wherein said supporting portion has a first disc-shaped section arranged to rest upon said second wall portions of said upper longitudinal walls of said base plate, and a second tubular section bounding an inner opening for receiving a foodstuff to be comminuted.

19. An arrangement as defined in claim 18, wherein said tubular section extends downwardly beyond said disc-shaped section of said supporting portion substantially to said upper surface of said base plate when said disc-shaped section rests on said second wall portions of said upper longitudinal walls of said base plate.

20. An arrangement as defined in claim 18, wherein said disc-shaped section of said supporting portion has a further tubular section extending downwardly and receivable inbetween said upper longitudinal walls of said base plate, said disc-shaped section having outer edges, and said further tubular section being provided at a location between said tubular section and said outer edges of said disc-shaped section of said supporting portion.

21. An arrangement as defined in claim 18, wherein said tubular section of said supporting portion of said foodstuff holder has a triangular cross-section and lateral walls which are outwardly convex.

22. An arrangement as defined in claim 18, wherein said pressing portion of said foodstuff holder has a plurality of pressing projections, said tubular section of said supporting portion of said foodstuff holder having two ends spaced from one another in a direction transverse to said base plate and being provided with a bottom wall at one of said ends which is spaced from said base plate, said bottom wall having a plurality of through-going holes through which said pressing projections of said pressing portion extend.

23. An arrangement as defined in claim 22, wherein said foodstuff holder is provided with means for sticking into a foodstuff to be comminuted, said sticking means being arranged at said bottom wall of said tubular section of said supporting portion.

24. An arrangement as defined in claim 23, wherein said bottom wall has a tubular projection located between said through-going holes and extending toward said base plate, said sticking means including a pin which is inserted and arrested in said tubular projection.

25. An arrangement as defined in claim 22, wherein said pressing portion of said foodstuff holder is a dome-shaped hood which has an upper wall upwardly bounding said inner opening of said tubular section of said supporting portion, said pressing projections being provided on said upper wall of said hood.

26. An arrangement as defined in claim 25, wherein said pressing portion has an intermediate wall which extends between said pressing projections and is so arranged that said bottom wall of said tubular section of said supporting portion can abut against said intermediate wall of said pressing portion.

27. An arrangement as defined in claim 25, wherein said pressing projections include one pressing projection arranged in a central region of said upper wall, and three pressing projections outwardly surrounding said one pressing projection, said one pressing projection having a circular cross-section whereas said three pressing projections have a substantially oval cross-section.

28. An arrangement as defined in claim 25, wherein each of said pressing projections is hollow and open at their sides adjacent to said upper wall.

29. An arrangement as defined in claim 22, wherein at least one of said pressing projections of said pressing portion has an abutment section, said tubular section of said supporting portion having an end spaced from said base plate and provided with an arresting projection which cooperates with said abutment section so as to prevent unauthorized withdrawal of said pressing portion from said supporting portion of said foodstuff holder.

30. An arrangement as defined in claim 29, wherein said arresting projection has a semicircular cross-section.

31. An arrangement as defined in claim 22, wherein each of said pressing projections has a free face and is provided with a plurality of tips at said free face, adapted to be pressed into a foodstuff to be comminuted.

32. An arrangement as defined in claim 8, wherein said lower longitudinal walls extend downwardly by a distance which decreases from said tubular handle to the other end of said elongated base plate.

33. An arrangement as defined in claim 7, wherein each of said lower longitudinal walls has a lower surface and is provided with a plurality of engaging projections on said lower surface.

34. An arrangement as defined in claim 33, wherein said projections are wave-like.

35. An arrangement as defined in claim 33, wherein said projections are formed by teeth.

36. An arrangement as defined in claim 33, wherein said projections are formed by pins.

37. An arrangement as defined in claim 7, wherein said through-going opening is bounded between said two lower longitudinal walls and two of said reinforcing ribs.

38. An arrangement as defined in claim 7, and further comprising a further receptacle formed adjacent to said through-going opening and arranged for receiving the one comminuting plate member so as to perform comminuting of the foodstuff, said two reinforcing ribs and one of said lower longitudinal walls in the region between said two reinforcing ribs each having a slot, the slots in said two reinforcing ribs and in said region of said one lower longitudinal wall being so arranged that they together form said further receptacle for receiving the one comminuting plate member.

39. An arrangement as defined in claim 38, wherein the other lower longitudinal wall has a laterally outer side, said other longitudinal wall being provided in the region between said two reinforcing ribs with a through-going slot which extends from said laterally outer side and is open into said through-going opening and into said further receptacle so that the one comminuting plate member can be inserted into said further receptacle from outside through said through-going slot.

40. An arrangement as defined in claim 39, wherein each of said first-mentioned receptacles for accommodating the other comminuting plate member which is not utilized at that very moment for comminuting, is formed by two slots provided in two other reinforcing ribs and a slot formed in said one lower longitudinal wall in the region between said two other reinforcing ribs.

41. An arrangement as defined in claim 40, wherein said other longitudinal wall is provided, in the region between said two other reinforcing ribs, with a further through-going slot extending from said laterally outer side and being open into said first-mentioned receptacle so that each of said other comminuting plate members can be inserted into and taken out of a respective one of said first-mentioned receptacles through said further through-going slot.

42. An arrangement as defined in claim 40, wherein said one comminuting plate member and said other comminuting plate members are arrested in said further receptacle and in said first-mentioned receptacles, respectively.

43. An arrangement as defined in claim 40, wherein said comminuting plate members are inserted into said receptacles in a direction transverse to the direction of elongation of said base plate and have such length that a portion of each of said comminuting plate members extends laterally outwardly beyond said laterally outer side of said other lower longitudinal wall of said base plate.

44. An arrangement as defined in claim 43, wherein said portion of each of said comminuting plate members which extends laterally outwardly beyond said laterally outer side or said other lower longitudinal wall of said base plate, is tubularly rolled so as to form a handle.

45. An arrangement as defined in claim 38, wherein said further receptacle is rectangular.

46. An arrangement as defined in claim 1, wherein each of said comminuting plate members has a plurality of uniform portions which are convex and have cutting edges.

47. An arrangement as defined in claim 1, wherein said receptacles are spaced from one another in a direction normal to said surfaces of said base plate.

* * * * *